UNITED STATES PATENT OFFICE.

HAYDEN M. BAKER, OF ROCHESTER, NEW YORK, ASSIGNOR TO HIMSELF, ALBERT M. HASTINGS, AND ALEXANDER McVEAN.

IMPROVED PROCESS FOR RECOVERING WASTE ALKALI.

Specification forming part of Letters Patent No. 54,093, dated April 24, 1866.

*To all whom it may concern:*

Be it known that I, HAYDEN M. BAKER, of Rochester, in the county of Monroe and State of New York, have invented a new and useful Process for the Recovery of Caustic Soda or Potash (used by paper-manufacturers in the preparation of paper-pulp from straw or other fibrinous substances) from the waste liquors and the utilizing of the vegetable matters contained in such waste liquors by their conversion into carbo-hydrogens, pyroligneous acid, ammonia, wood-tar, and the products contained in the same; and I do hereby declare that the following is a full and exact description of such process.

The nature of my invention consists in the evaporation of the waste liquors to dryness, or as nearly so as practicable, the resulting brownish-black and highly-viscid product being subsequently introduced into a retort of iron or clay with ten per cent. its weight of quicklime, said retort having been previously heated to a sufficiently elevated temperature to produce the greatest abundance of gas from the material used, and the heat being maintained for a sufficient period of time to produce as nearly as practicable the entire decomposition of the vegetable matter.

The products remaining in the retort consist principally of caustic soda, (or the alkali used,) carbonate of lime, the alkaline silicates, earthy silicates, and the insoluble phosphates. The caustic alkali, being the only soluble matter, is readily removed by lixiviation in hot or cold water, and the resulting solution applied in the treatment of new material.

To enable others skilled in the art of treating straw and other fibrinous substances with alkali to make use of my invention, I will proceed to describe it more particularly.

First, I have a large tank for the reception of the waste liquors, which are drained and pressed out of the material treated with alkali by any convenient press or apparatus into said tank.

Second, I run or convey the liquors, by means of a pipe provided with a stop-cock, from the reception-tank to the evaporating-vessel, which may be constructed like a vacuum-pan, still, or which may be a large open vessel having a very distended surface to facilitate rapid evaporation. Evaporation is continued as nearly as possible to dryness. The resulting product is a brownish-black and highly-viscid mass, consisting of vegetable matter from the straw or other material treated and the caustic alkali used in extracting the same, together with the soluble salts formed by the action of the alkali and those previously existing in said vegetable matter treated.

Third, I now transfer the viscid mass to a retort or still constructed like a gas-retort or pyroligneous-acid still, (either being provided with the usual appendages for the condensation of the liquid products and a gasometer for the reception of the gas,) with a sufficient quantity of quicklime to absorb the carbonic acid formed in the process of decomposition. If the object be to produce gas, then a gas-retort is used, which must be heated to quite an elevated temperature previous to the introduction of the viscid mass, and the heat maintained until the vegetable matter is decomposed as nearly as practicable. If pyroligneous acid and the products usual in the destructive distillation of wood are desired, then the still is used, which must be of a temperature not exceeding 212° Fahrenheit at the time of the introduction of the viscid mass, but may after said introduction have its temperature gradually elevated and maintained until the entire decomposition of the vegetable matter is effected. During the first stages of distillation the gaseous products consist of carbonic acid, carbonic oxide, carbonate of ammonia, sulphurous acid, and gases rich in hydrogen and suitable for fuel, but destitute of illuminating properties. These are conveyed under the retort and consumed. During the more advanced stages of distillation, water, tar, &c., (which are condensed in the usual manner,) and gases rich in carbon suitable for illuminating purposes are the products, the gas being conveyed to a gasometer, from which it may be conducted in pipes and used in any desired manner. The tar and water may be utilized by extracting the chemical substances contained therein, or the tar may be used as fuel and the water thrown away.

Fourth, the mass remaining in the retort resembles coke, and is now withdrawn, pulverized, and immersed in hot water, the caustic alkali dissolving in that menstruum and other bodies precipitating. The solution is first agitated and then allowed to repose until the foreign bodies have subsided. The clear liquor is now drawn off and is ready for use in treating fresh quantities of material. The quantity of alkali recovered varies from forty-five to ninety per cent., but averages sixty-six per cent.

The advantages of this invention are that the paper-manufacturer is enabled thereby to recover a large proportion of the alkali used by him in the treatment of straw and other fibrinous substances (heretofore entirely wasted) at a very moderate cost, and to use it again in the treatment of fresh quantities of material, and also to use the waste vegetable matter either as fuel or illuminating-gas.

What I claim as my invention, and desire to secure by Letters Patent, is—

The recovery of the alkali (used in the preparation of paper-stock) in its caustic state by transmitted caloric, and the utilization of the vegetable matter upon the principles of destructive distillation, thereby forming useful products such as are usual in the destructive distillation of wood and coal, in the manner herein described and set forth, or any other process substantially the same which produces the same intended results or effects herein described.

HAYDEN M. BAKER.

Witnesses:
  D. L. CRITTENDEN,
  A. McVEAN.